Figure 1:
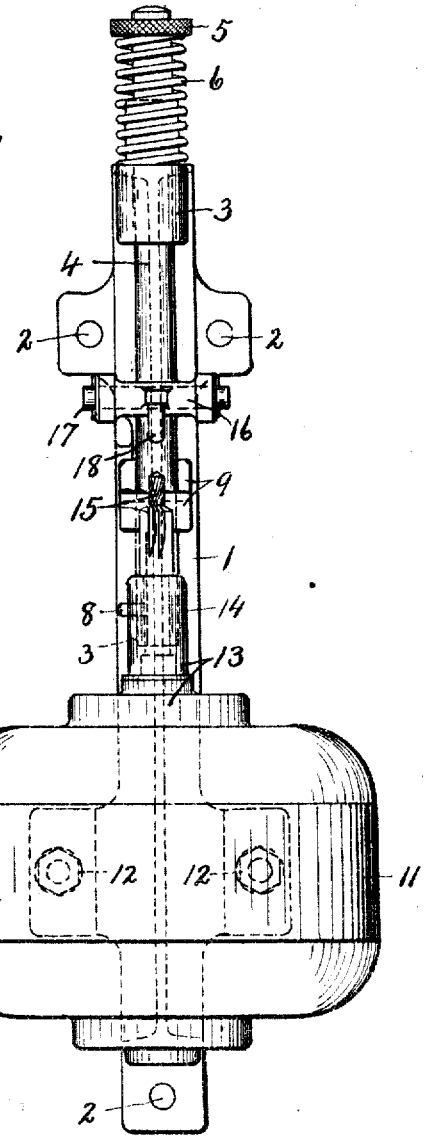

May 13, 1924.　　　　　　　　　　　　　　　　　　1,494,216
G. B. CADY
BRAKE LINING DRILL AND COUNTERSINK
Filed May 17, 1923　　　2 Sheets-Sheet 1

INVENTOR
Geo. B. Cady
BY
ATTORNEY

May 13, 1924.  
G. B. CADY  
1,494,216  
BRAKE LINING DRILL AND COUNTERSINK  
Filed May 17, 1923   2 Sheets-Sheet 2

INVENTOR  
Geo. B. Cady  
BY  
ATTORNEY

Patented May 13, 1924.

1,494,216

UNITED STATES PATENT OFFICE.

GEORGE B. CADY, OF CANASTOTA, NEW YORK.

BRAKE-LINING DRILL AND COUNTERSINK.

Application filed May 17, 1923. Serial No. 639,552.

*To all whom it may concern:*

Be it known that I, GEORGE B. CADY, a citizen of the United States of America, of Canastota, in the county of Madison, in the State of New York, have invented new and useful Improvements in Brake-Lining Drills and Countersinks, of which the following, taken in connection with the accompanying drawings, is a full, clear, and exact description.

This invention relates to a counter-boring machine adapted to be used more specifically for counter-boring the linings of brake bands and analagous articles for receiving the heads of rivets or similar fastening devices commonly used in fastening brake linings to their respective supports which are usually made of more or less resilient metal.

These brake bands or segments are usually concave or convex with the lining secured to the inner concave face thereof by means of rivets or equivalent fastening means, and one of the main objects is to provide a simple and efficient implement by which the inner concave faces of the linings may be counterbored coaxially with the rivet holes in the metallic supported segment so that when the rivets are secured in place, their heads will lie within the inner faces of the lining to avoid contact with the surface of the brake drum.

Other objects relating to specific parts of the machine will be brought out in the following description.

Figure 2:
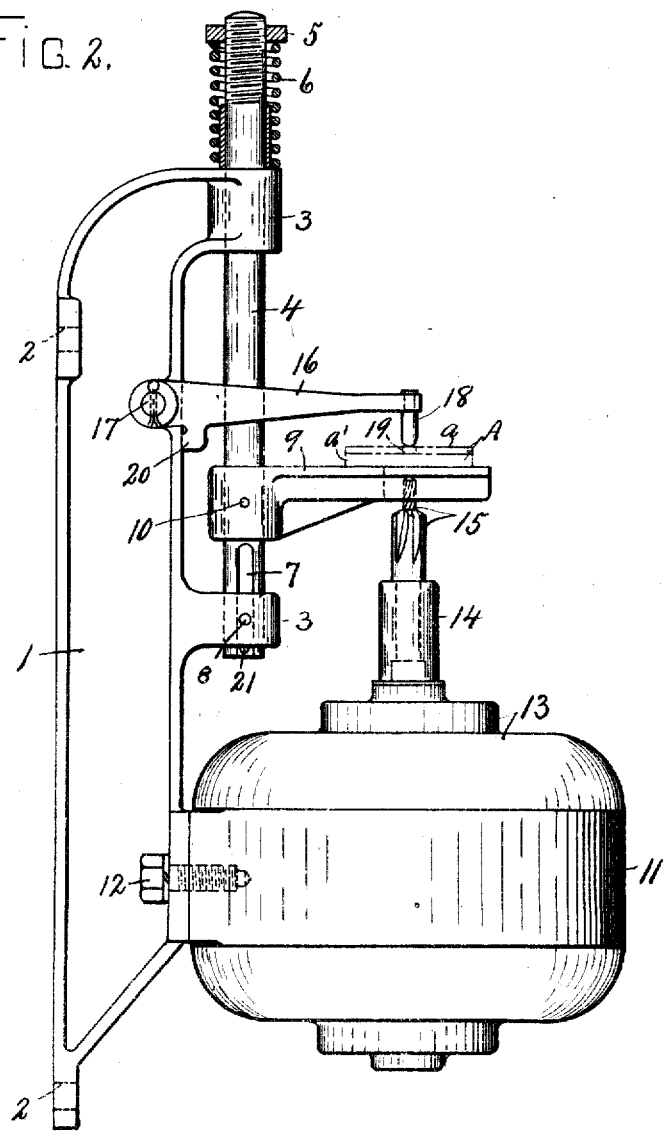

In the drawings,

Figures 1 and 2 are respectively, a front elevation and a side elevation of a machine embodying the various features of my invention, a portion of the machine shown in Figure 2 being in section.

The machine is comparatively light and easily portable from place to place, but is adapted to be secured in an upright position to any suitable upright support not shown and for this purpose is provided with an upright frame —1— having a substantially flat back provided with bolt openings —2— for receiving suitable bolts not shown, whereby the machine as a whole, may be clamped to an upright wall or other available support at such height as may be most convenient for the operator.

The frame —1— is provided on its front side, with vertically alined bearings —3— in vertically spaced relation for receiving a vertically movable rod or bar —4— which is slidable in said bearings.

The upper end of the rod —4— is threaded and engaged by a nut —5— and between this nut and the upper face of the upper bearing —3— is located a coil spring —6— which surrounds the adjacent portion of the rod —4— for retracting the rod —4— upwardly and yieldingly holding it in an elevated position so that it may be moved downwardly against the action of the spring when desired and for the purpose hereinafter described.

The nut —5— may be adjusted to place the spring —6— under the desired tension sufficient to assure the upward movement of the rod —4— and parts carried thereby.

The lower end of the rod is provided with a slot or key-way —7— for receiving a pin —8— in the bearing —3— to hold said rod against relative turning movement in its bearings, said slot or key-way being elongated vertically to permit the desired vertical movement of the rod.

A work table —9— is secured by a key-pin —10— to the intermediate portion of the rod —4— by the bearings —3— and extends forwardly from said rod a sufficient distance to permit the work, as for example, the brake band —A— to be placed thereon for centering and counter-boring purposes.

A motor supporting frame —11— is secured by bolts —12— to the front face of the lower end of the frame —1— and extends forwardly therefrom in a horizontal plane some distance below the lower bearing —3— for receiving and supporting an electric motor —13— with its armature shaft as —14— in a vertical position directly under the forwardly projecting end of the work table —9—.

A counter-boring tool —15— is secured to the motor shaft —14— with its working end uppermost and is adapted to extend into an opening in the front end of the work table —9—.

A forwardly and rearwardly extending work centering arm —16— is pivoted at —17— to the frame —1— and extends forwardly therefrom directly over the work table —9— and is provided at its front end with a downwardly projecting centering pin —18— in coaxial vertical alinement with the axis of the counter-boring tool —15— for engaging in the rivet holes as —19— in the metal segment —a— of the work —A— for properly centering the rivet holes in the work relatively to the counter-boring tool —15—.

The centering arm —16— is adapted to be rocked vertically by hand about the axis of its pivot —17— and is provided with a stop shoulder —20— adapted to engage the front face of the frame —1— for limiting the downward movement of the front end of the arm —16— to a position which will support the entering pin —18— in coaxial vertical alinement with the counter-boring tool —15— thus permitting the work to be readily placed upon the work table —9— for centering and counter-boring purposes when the arm —16— is elevated after which said arm is allowed to drop by its own weight until limited by engagement with the stop pin —20— with the frame —1— or by the engagement of the pin —18— in the rivet hole —19— of the work —a—.

When the work is placed upon the table —9— and properly centered by the registering of the pin —18— with the hole —19—, the work together with the table —9— and its supporting rod —4— is pressed downwardly by hand against the action of the spring —6— thereby causing the small drilling end of the counter-boring tool —15— to drill a relatively small hole through the brake band lining as —a'— in coincidence with the previously formed hole —19— in the metal backing —a— and as this downward movement of the work and its supporting table continues, the relatively larger counter-boring portion of the tool will be brought into engagement with the inner face of the lining to enlarge the bore for receiving the head of the rivet not shown but which is to be inserted through the registering holes in the lining and metal backing and properly riveted in place for securing the lining to the backing with the assurance that the inner head of the rivet will be counter-sunk within the inner face of the lining, it being understood that the motor is in motion during the drilling and counter-drilling operation and that immediately following this operation, the pressure of the operator upon the work is released to yield said work together with the table —9— and its supporting rod —4— to be returned upwardly by the spring —6—, this operation being repeated by each rivet hole in the brake band.

The lower end of the rod —4— is provided with a stop pin —21— adapted to engage the underside of the lower bearing —3— for limiting the upward movement of the said rod and parts carried thereby by the spring —6—.

It is evident, however that various changes may be made in the detail construction and arrangement of various parts of this device without departing from the spirit of this invention.

I claim:

1. A drill and counter-boring machine comprising an upright frame, a rod slidable vertically on the frame and spring-pressed upwardly, a work table carried by the rod, a motor mounted on the frame beneath the work table, and provided with a vertically disposed shaft, a drilling and counter-boring tool direct-connected with the upper end of the motor shaft, and a work centering device pivotally mounted on the frame above the work table to swing vertically and provided with a work centering pin coaxial with the axis of the counter-boring tool for centering the work relatively to said tool.

2. A device for drilling and counter-boring the linings of brake bands comprising an upright frame having forwardly projecting bearings in vertically spaced relation, a rod slidable vertically in said bearings, a work table secured to and projecting forwardly from the rod, means above the work table for centering the work thereon, a rotary tool supporting member below the work table provided with a counter-boring tool coaxial with the work centering means when the latter is adjusted for use, said rod and work table, together with the work thereon being depressable by hand to bring the work into engagement with the counter-boring tool.

In witness whereof I have hereunto set my hand this 30th day of April, 1923.

GEO. B. CADY.

Witnesses:
FRED. S. MOORE,
LEON G. PRESTON.